US012739377B2

(12) United States Patent
Helmrich et al.

(10) Patent No.: US 12,739,377 B2
(45) Date of Patent: Sep. 15, 2026

(54) SELECTIVE INTER-COMPONENT TRANSFORM (ICT) FOR IMAGE AND VIDEO CODING

(71) Applicant: Fraunhofer-Gesellschaft zur Foerderung der angewandten Forschung e.V., Munich (DE)

(72) Inventors: Christian Helmrich, Berlin (DE); Christian Rudat, Berlin (DE); Tung Hoang Nguyen, Berlin (DE); Heiko Schwarz, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 390 days.

(21) Appl. No.: 17/472,159

(22) Filed: Sep. 10, 2021

(65) Prior Publication Data

US 2021/0409708 A1 Dec. 30, 2021

Related U.S. Application Data

(63) Continuation of application No. PCT/EP2020/056553, filed on Mar. 11, 2020.

(30) Foreign Application Priority Data

Mar. 12, 2019 (EP) .................................... 19162323

(51) Int. Cl.
*H04N 19/12* (2014.01)
*H04N 19/122* (2014.01)
(Continued)

(52) U.S. Cl.
CPC .......... *H04N 19/12* (2014.11); *H04N 19/122* (2014.11); *H04N 19/147* (2014.11);
(Continued)

(58) Field of Classification Search
None
See application file for complete search history.

(56) References Cited

U.S. PATENT DOCUMENTS

2006/0146191 A1* 7/2006 Kim .................... H04N 19/109 348/448
2010/0232691 A1 9/2010 Sekiguchi et al.
(Continued)

FOREIGN PATENT DOCUMENTS

CA 2994282 C * 7/2020 .......... H04N 1/6058
WO WO 2009/051010 4/2009
WO WO 2020/175970 9/2020

OTHER PUBLICATIONS

Bross, Benjamin, et al., "Versatile Video Coding (Draft 4)", v. 4, JVET-M1001, Marrakech, http://phenix.it-sudparis.eu/jvet/doc_end_user/current_document.php?id=5755, 267 pgs.
(Continued)

*Primary Examiner* — Mohammed Jebari
(74) *Attorney, Agent, or Firm* — Sage Patent Group

(57) ABSTRACT

An encoder for encoding a plurality of components of an image content region of an image to be encoded is configured for obtaining the plurality of components representing the image content region; selecting an intercomponent transform from a set of intercomponent transforms; encoding the plurality of components using the selected intercomponent transform to obtain encoded components; and providing the encoded components.

14 Claims, 4 Drawing Sheets

(51) Int. Cl.

| | |
|---|---|
| ***H04N 19/147*** | (2014.01) |
| ***H04N 19/154*** | (2014.01) |
| ***H04N 19/176*** | (2014.01) |
| ***H04N 19/186*** | (2014.01) |
| ***H04N 19/19*** | (2014.01) |
| ***H04N 19/46*** | (2014.01) |
| ***H04N 19/60*** | (2014.01) |
| ***H04N 19/61*** | (2014.01) |
| ***H04N 19/70*** | (2014.01) |

(52) U.S. Cl.
CPC ......... *H04N 19/154* (2014.11); *H04N 19/176* (2014.11); *H04N 19/186* (2014.11); *H04N 19/19* (2014.11); *H04N 19/46* (2014.11); *H04N 19/60* (2014.11); *H04N 19/61* (2014.11); *H04N 19/70* (2014.11)

(56) References Cited

U.S. PATENT DOCUMENTS

| | | | | |
|---|---|---|---|---|
| 2013/0064465 | A1* | 3/2013 | Tin | G06T 7/11 382/248 |
| 2013/0129245 | A1* | 5/2013 | Tin | H04N 19/60 382/248 |
| 2014/0307801 | A1* | 10/2014 | Ikai | H04N 19/117 375/240.18 |
| 2014/0368610 | A1* | 12/2014 | Grangetto | H04N 1/32309 348/43 |
| 2014/0369426 | A1 | 12/2014 | Li et al. | |
| 2015/0124865 | A1* | 5/2015 | Kim | H04N 19/105 375/240.12 |
| 2015/0245061 | A1 | 8/2015 | Chen et al. | |
| 2016/0080751 | A1* | 3/2016 | Xiu | H04N 19/157 375/240.02 |
| 2016/0100175 | A1* | 4/2016 | Laroche | H04N 19/192 375/240.18 |
| 2017/0078672 | A1* | 3/2017 | Han | H04N 19/593 |
| 2019/0098317 | A1* | 3/2019 | Lu | H04N 19/149 |
| 2020/0195953 | A1* | 6/2020 | Lainema | H04N 19/176 |
| 2020/0288159 | A1* | 9/2020 | Van der Auwera | H04N 19/186 |
| 2020/0288173 | A1* | 9/2020 | Ye | H04N 19/176 |
| 2021/0352304 | A1* | 11/2021 | Chernyak | H04N 19/186 |
| 2021/0409731 | A1* | 12/2021 | Chen | H04N 19/119 |
| 2022/0007013 | A1* | 1/2022 | Zhu | H04N 19/96 |
| 2022/0014749 | A1* | 1/2022 | Lim | H04N 19/157 |
| 2022/0046232 | A1* | 2/2022 | Piao | H04N 19/105 |
| 2022/0109877 | A1* | 4/2022 | Choi | H04N 19/176 |

OTHER PUBLICATIONS

Johnston, J D, et al., "Sum-Difference Stereo Transform Coding", in Proc. IEEE Int. Conf. Acoust. Speech Sig. Process. (ICASSP), San Francisco, vol. 2, Mar. 1992, pp. 569-572.

Johnston, J D, "Perceptual Transform Coding of Wideband Stereo Signals", in Proc. IEEE Int. Conf. Acoust. Speech Sig. Process. (ICASSP), Glasgow, vol. 3, May 1989, pp. 1993-1996.

Khairat, Ali , et al., "Adaptive cross-component prediction for 4:4:4 high efficiency video coding", 2014 IEEE International Conference on Image Processing (ICIP), doi:10.1109/ICIP.2014.7025758, ISBN 978-1-47-995751-4, XP055205888 DOI: http://dx.doi.org/10.1109/ICIP.2014.7025758, pp. 3734-3738.

Lainema, Jani, "CE7-rel.: Joint coding of chrominance residuals", JVET-M0305, Marrakech, http://phenix.it-sudparis.eu/jvet/doc_end_user/current_document.php?id=5112, 5 pgs.

Van Der Waal, Robbert G, et al., "Subband Coding of Stereophonic Digital Audio Signals", in Proc. IEEE Int. Conf. Acoust. Speech Sig. Process. (ICASSP), Toronto, https://www.computer.org/csdl/proceedings/icassp/1991/0003/00/00151053.pdf, Apr. 1991, pp. 3601-3604.

Zhang, Kai, et al., "Enhanced cross-component linear model intra prediction", JVET-D0110, http://phenix.it-sudparis.eu/jvet/doc_end_user/current_document.php?id=2806, 6 pgs.

Zhang, Kai, et al., "Multi-model based cross-component linear model chroma intra-prediction for video coding", 2017 IEEE Visual Communications and Image Processing (VCIP), IEEE, doi:10.1109/VCIP.2017.8305103, XP033325781 DOI: http://dx.doi.org/10.1109/VCIP.2017.8305103, pp. 1-4.

* cited by examiner

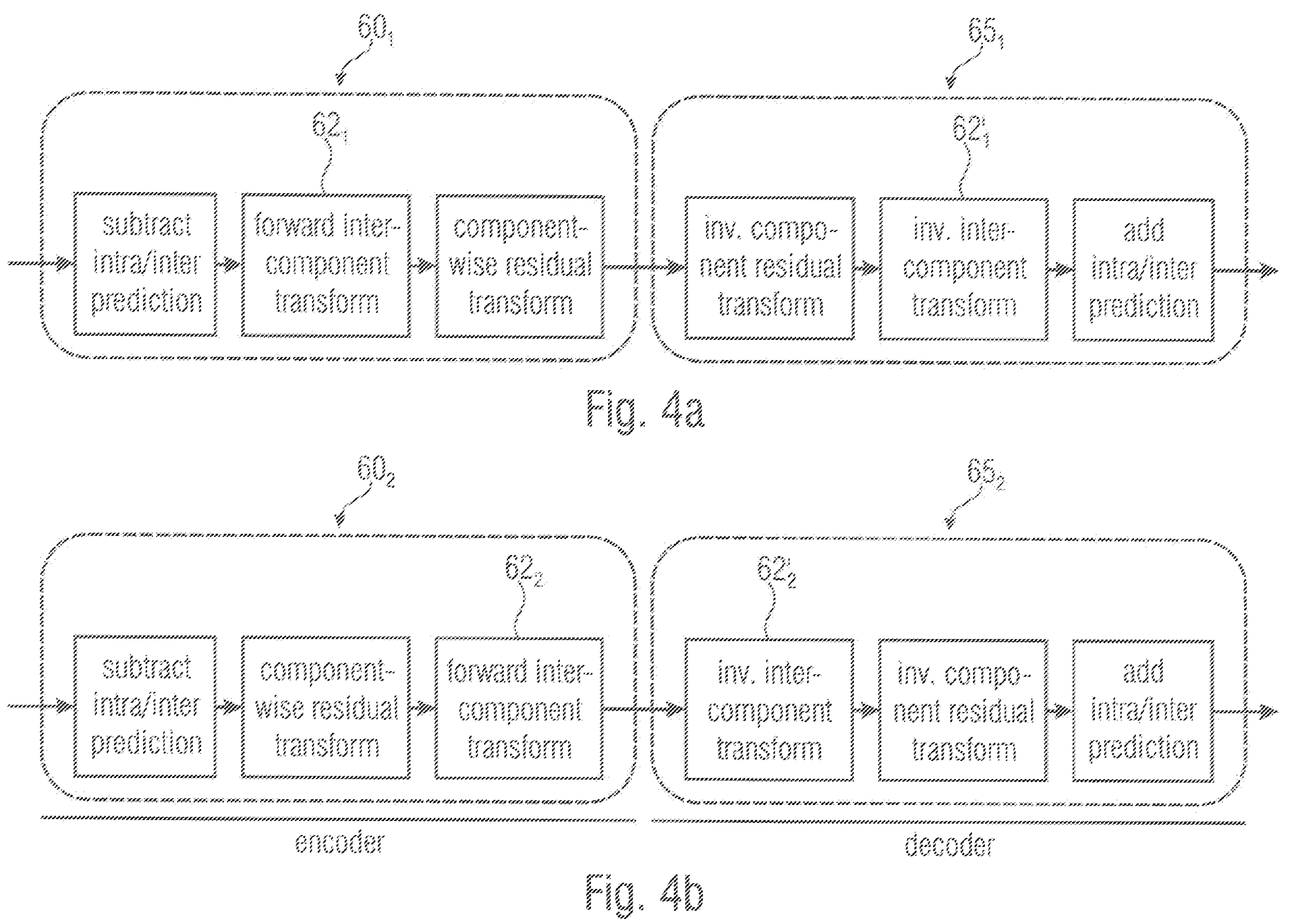

$60_1$
$65_1$
$62_1$
$62'_1$
subtract intra/inter prediction
forward inter-component transform
component-wise residual transform
inv. component residual transform
inv. inter-component transform
add intra/inter prediction
Fig. 4a
$60_2$
$65_2$
$62_2$
$62'_2$
subtract intra/inter prediction
component-wise residual transform
forward inter-component transform
inv. inter-component transform
inv. component residual transform
add intra/inter prediction
encoder
decoder
Fig. 4b

SELECTIVE INTER-COMPONENT TRANSFORM (ICT) FOR IMAGE AND VIDEO CODING

REFERENCES TO CROSS-RELATED APPLICATIONS

This application is a continuation of copending International Application No. PCT/EP2020/056553, filed Mar. 11, 2020, which is incorporated herein by reference in its entirety, and additionally claims priority from European Application No. EP 19 162 323.0, filed Mar. 12, 2019, which is incorporated herein by reference in its entirety.

BACKGROUND OF THE INVENTION

1. Introduction, State of the Art

In natural still and moving color pictures (simply referred to as images and videos hereafter), a significant amount of signal correlation between the individual color components can generally be observed. This is particularly the case with content represented in a YUV or YCbCr (luma-chroma) or an RGB (red-green-blue) domain. To efficiently exploit such inter-component redundancy in image or video coding, several predictive techniques have recently been proposed. Of these, the most notable are

- cross-component linear-model (CCLM) prediction, a linear predictive coding (LPC) method which predicts, on a block level, one component's input signal from another (usually the luma) decoded component's signal and encodes only the error, i.e., the difference between input and prediction;
- joint chroma coding (JCC), an approach which encodes only the difference between two chroma residual signals (i. e., only a single downmix) and decodes said two chroma signals using the simple sample-wise upmix rule "V=−U" or "Cr=−Cb" for YUV or YCbCr coding, respectively. In other words, the JCC upmix represents a prediction of V or Cr from U or Cb, respectively, without coding an associated error, or residual, for V respectively Cr during the JCC downmix process.

Both the CCLM and JCC techniques, which are described in detail in [1] and [2], respectively, signal their activation in a particular coding block to the decoder by means of a single flag. Moreover, it is worth noting that both schemes can, in principle, be applied between an arbitrary component pair, i.e.,

- between a luma and a chroma signal, or between two chroma signals, in YUV or YCbCr coding,
- between an R and a G signal or an R and a B signal or, finally, a G and a B signal in RGB coding.

In the above list, the term "signal" may denote a spatial-domain input signal within a particular region, or block, of the input image or video, or it may represent the residual (i. e., difference or error) between said spatial-domain input signal and the spatial-domain prediction signal obtained using an arbitrary spatial, spectral, or temporal predictive coding technique (e.g. angular Intra prediction or motion compensation).

SUMMARY

An embodiment may have an encoder for encoding a plurality of components of an image content region of an image to be encoded, wherein the encoder is configured for: acquiring the plurality of components representing the image content region; selecting an intercomponent transform from a set of intercomponent transforms; encoding the plurality of components using the selected intercomponent transform to acquire encoded components; and providing the encoded components.

Another embodiment may have a decoder configured for decoding encoded components of an image content region of a received image, wherein the decoder is configured for: acquiring the encoded components; selecting an inverse intercomponent transform from a set of inverse intercomponent transforms; and decoding a plurality of components representing the image content region using the selected inverse intercomponent transform.

According to another embodiment, a method for decoding encoded components of an image content region of a received image may have the steps of: acquiring the encoded components; selecting an inverse intercomponent transform from a set of inverse intercomponent transforms; and decoding a plurality of components representing the image content region using the selected inverse intercomponent transform.

3. Summary of Invention

To address the above-noted shortcomings, the present invention comprises the following aspects, where the term signaling denotes the transmission of coding information from an encoder to a decoder. Each of these aspects will be described in detail in a separate section.

1. Block or picture-selective application (i. e., activation) of one of at least two inter-component joint coding/decoding methods, along with a corresponding block or picture-wise explicit signaling of the application of said joint coding/decoding by means of a (possibly entropy coded) on/off flag, or, alternatively, a non-binary index; The two or more inter-component methods may represent any of the following:
   - Coding of a single downmix channel which represents two color channels; with C' representing the decoded downmix channel, the decoded color channels are obtained by Cb'=a C' and Cr'=b C', where a and b represent specific mixing factor (often either a or b are set equal to 1);
   - Coding of two mixing channels; with $C_1'$ and $C_2'$ being the decoded mixing channels; the decoded color components Cb' and Cr' are obtained by applying an orthogonal (or nearly orthogonal) transform of size 2 to the decoded mixing channels $C_1'$ and $C_2'$.
   - Both methods can be extended to more than two color components. If the mixing is applied to N>2 color components, it is also possible to code M<N (with M>1) mixing channels and reconstruct the N color components given the M<N decoded mixing channels.
2. when joint coding/decoding is applied (i. e., activated), implicit signaling of the applied one of the at least two inter-component methods by means of existing coded block flag bitstream elements,
3. block or picture-wise direct or indirect signaling of the decoding parameters (e. g., upmix matrix, inverse-transform type, inverse-transform coefficient(s), rotational angle, or linear prediction factor(s)) of all the inter-component joint coding/decoding methods applied in said block or picture,
4. fast encoder-side decisions (instead of exhaustive searches) when selecting, on a picture or block level, the one of the at least two inter-component joint coding/decoding methods to be applied.

BRIEF DESCRIPTION OF THE DRAWINGS

Embodiments of the present invention will be detailed subsequently referring to the appended drawings, in which:

FIG. 4*a-b* show functionality of a respective encoder according to an embodiment.

DETAILED DESCRIPTION OF THE INVENTION

Figure 1:
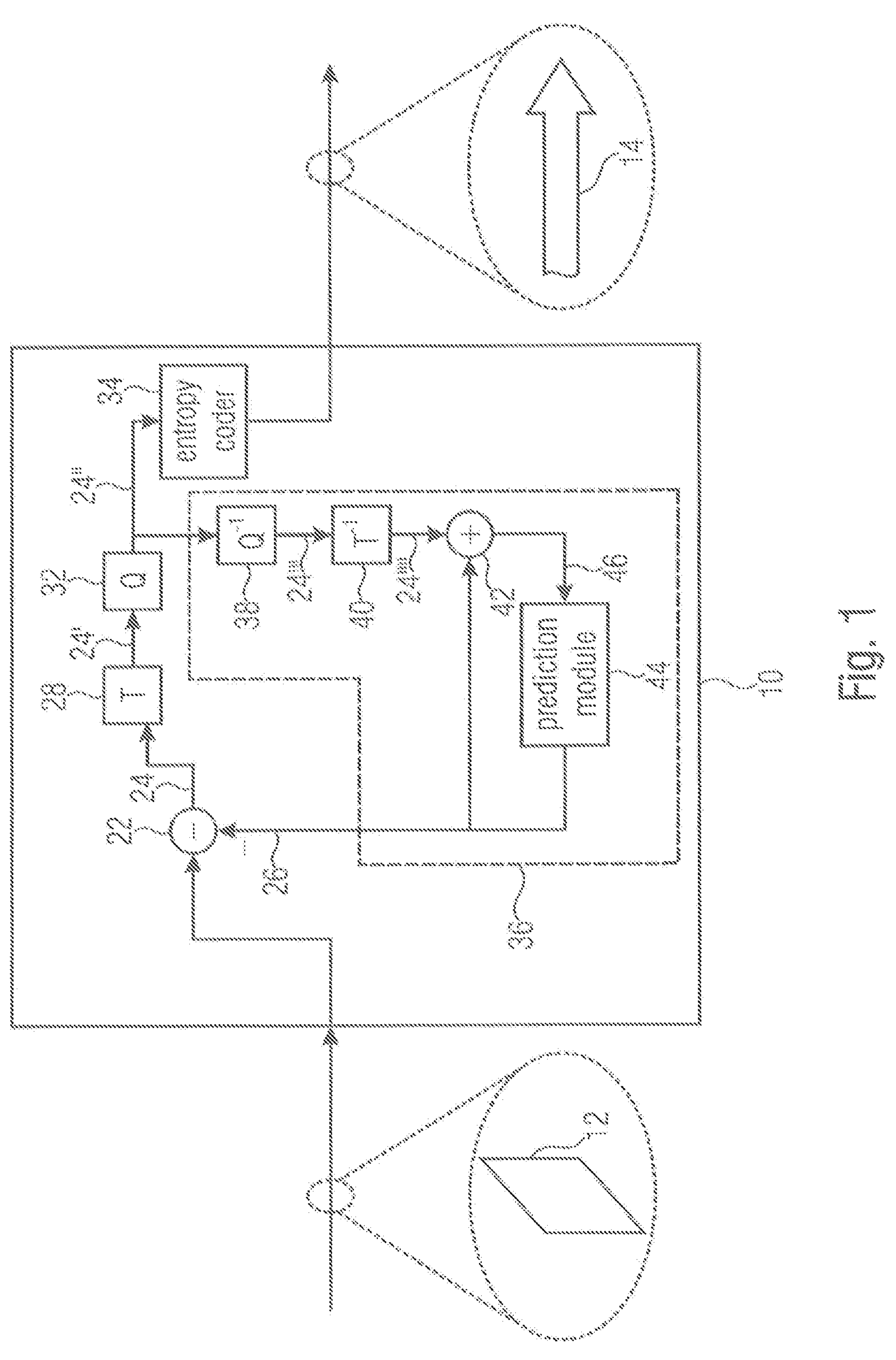
FIG. 1 shows an apparatus for predictively coding a picture into a data stream exemplarily using transform-based residual coding.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Figure 2:
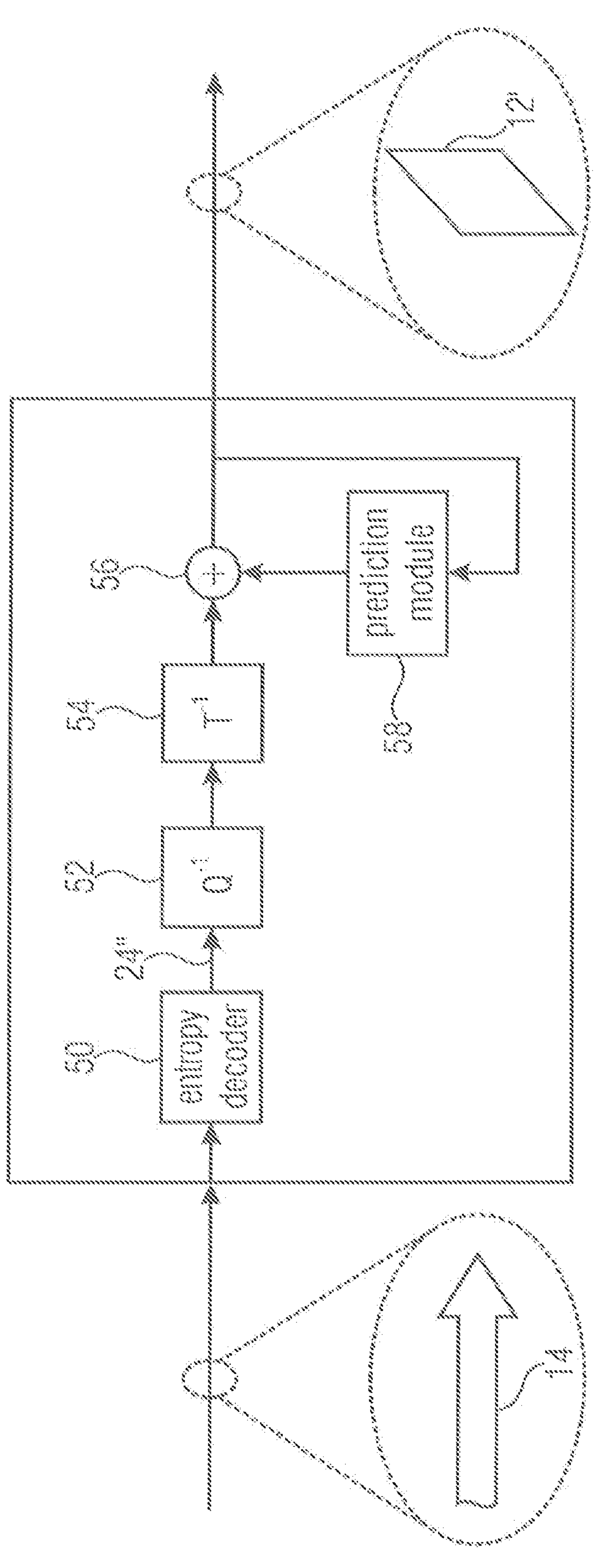
FIG. 2 shows a decoder corresponding to FIG. 1.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24'", which corresponds to signal 24' except for quantization loss, followed by an inverse transformer 40 which subjects the latter prediction residual signal 24'" to an inverse transformation, i.e. a spectral-to-spatial transformation, to obtain prediction residual signal 24"", which corresponds to the original prediction residual signal 24 except for quantization loss. A combiner 42 of the prediction stage 36 then recombines, such as by addition, the prediction signal 26 and the prediction residual signal 244"" so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
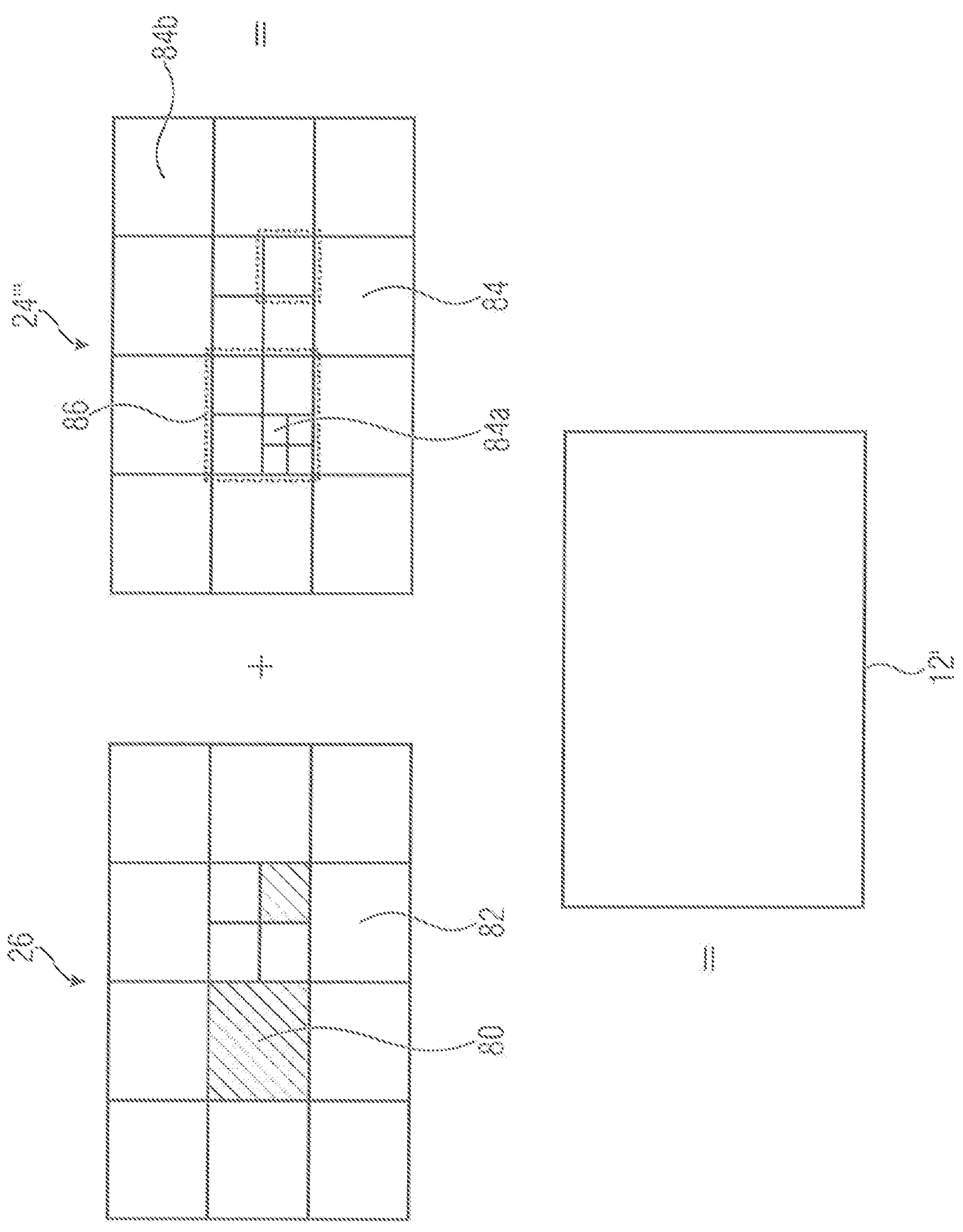
FIG. 3 illustrates the relationship between a reconstructed signal on the one hand, and the combination of the prediction residual signal on the other hand.

FIG. 3 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

- DCT-II (or DCT-III), where DCT stands for Discrete Cosine Transform

- DST-IV, where DST stands for Discrete Sine Transform
- DCT-IV
- DST-VII
- Identity Transformation (IT)

Naturally, while transformer 28 would support all of the forward transform versions of these transforms, the decoder 20 or inverse transformer 54 would support the corresponding backward or inverse versions thereof:

- Inverse DCT-II (or inverse DCT-III)
- Inverse DST-IV
- Inverse DCT-IV
- Inverse DST-VII
- Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3. Likewise, decoders according to embodiments of the present application may perform block-based decoding of picture 12' from data stream 14 using the coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Embodiments of the present invention will now be described whilst making at least in parts reference to FIG. 4*a* and FIG. 4*b* that show functionality of a respective encoder $\mathbf{60}_1$, $\mathbf{60}_2$ respectively and a respective decoder $\mathbf{65}_1$, $\mathbf{65}_2$ respectively. The configurations of FIG. 4*a* and FIG. 4*b* deviate with respect to each other in view of the sequential order at which the inventive selected intercomponent transform $\mathbf{62}_1$ or $\mathbf{62}_2$, its inverse version $\mathbf{62}_1'$ or $\mathbf{62}_2'$ respectively, is applied.

2. Shortcomings of State of the Art

While the abovementioned solutions succeed in increasing the coding efficiency in a modern image or video codec, two shortcomings can be identified in connection with the CCLM and JCC approaches:

- Applying the CCLM method between two chroma-channel signals may use, in both the encoder and decoder, a computationally relatively complex derivation of a particular prediction parameter (a CCLM weight) from top and left neighboring samples of the coding block under consideration.
- Employing the JCC technique was found to be relatively inflexible since only a signal difference is supported for downmixing and upmixing. While on average, this approach works well for YUV or YCbCr coded content, the coding gains were found to be relatively low on RGB coded input and on natural images or videos recorded with cameras suffering from notable chromatic aberration.

It is, therefore, desirable to provide a more flexible method and apparatus for joint-component coding of images or videos, which retains the low complexity of the JCC approach.

3.1. Selective Application of ICT with Explicit Application Signaling

It is proposed to allow, during image or video encoding, an optional and selective application of an inter-component transform (ICT) for joint residual-sample coding. As shown in FIG. 1, this ICT design applies a forward joint-component transform (downmix) before or after a conventional component-wise residual transform during coding and a corresponding inverse joint-component transform (upmix) after or before a conventional component-wise inverse residual transform during decoding. Unlike the known technology of Sections 1 or 2, however, the encoder is given the possibility to choose between more than one ICT method during coding, i.e., to not apply ICT coding or to apply one ICT method out of a set of at least two ICT methods. Combined with the inventive aspects of Section 3.3, this yields more flexibility than the known technology.

The selection and application (also called activation) of the specific one of at least two ICT methods could be performed globally for each image, video, frame, tile, or slice (also slice/tile in more recent MPEG/ITU codecs, simply called picture in the following). However, in hybrid block-based image or video coding/decoding it is advantageously applied in a block-adaptive way. The block for which the application of one of multiple supported ICT methods is selected can represent any of the following: a coding tree unit, a coding unit, a prediction unit, a transform unit, or any other block within said image, video, frame, or slice.

Whether any of the multiple ICT methods is applied and which of these methods is applied is signaled inside the bitstream using one or more syntax elements on a picture, slice, tile, or block level (i.e., at the same granularity at which the ICT is applied). In one embodiment (further described in Sec. 3.2), the fact that the inventive ICT coding is applied, or not applied, is signaled using a (possibly entropy coded) on/off flag, for each of said pictures or for each of the blocks to which the ICT coding is applicable. In other words, the activation of an inventive ICT method (of at least two) is signaled explicitly by means of a single bit or bin per picture resp. block (a bin denotes an entropy coded bit, which can consume a mean size of less than 1 bit with proper coding). In an advantageous version of this embodiment, the application of an ICT method is signaled by a binary on/off flag. The information which of the multiple ICT methods is applied is signaled via combinations of additionally transmitted coded block flags (details follow in Sec. 3.2). In another embodiment, the application of an ICT method and the ICT method used is signaled using a non-binary syntax element.

For both embodiments, the binary or non-binary syntax elements indicating the usage of the ICT method may only be present (in the syntax) if one or more coded block flags (which indicate whether a transform block has any non-zero transform coefficients) are equal to one. If the ICT-related syntax element is not present, the decoder infers that none ICT method is used.

Furthermore, the high-level syntax may include syntax elements that indicate the presence of the block-level syntax elements as well as their meaning (see Sec. 3.3). On the one hand, such high-level syntax elements can indicate whether any of the ICT methods is available for a current picture, slice, or tile. On the other hand, the high-level syntax can indicate which subset of a larger set of ICT methods is available for the current picture, slice, or tile of a picture.

In the following, we describe specific variants for inter-component transforms. These variants are described for two specific color components on the example of the chroma components Cb and Cr for image and video signals in the typically used YCbCr format. Nonetheless, the invention is not restricted to this use case. The invention can also be used for any other two color components (for example, for a red and a blue component in RGB video). Furthermore, the invention can also be applied to the coding of more than two color components (such as the three components Y, Cb, and Cr in YCbCr video, or the three components R, G, and B in RGB video).

ICT Class 1: Transform-Based Coding

In a first ICT variant, two color channels $C_1$ and $C_2$ may be transmitted. These two color channels represent transform components of a transform with (at least nearly) orthogonal basis functions. Let $C_1'$ and $C_2'$ denote the reconstructed color channels. At the decoder side, the reconstructions Cb' and Cr' for the original color components are derived using a transform with orthogonal basis functions, which can be specified according to $$\begin{bmatrix} Cb' \\ Cr' \end{bmatrix} = \begin{bmatrix} \cos\alpha & \sin\alpha \\ -\sin\alpha & \cos\alpha \end{bmatrix} \cdot \begin{bmatrix} w_1 & 0 \\ 0 & w_2 \end{bmatrix} \cdot \begin{bmatrix} C_1' \\ C_2' \end{bmatrix},$$

where $\alpha$ represents a rotation angle in the signal space and $w_1$ and $w_2$ represent non-zero weighting factors. In most configurations, the weighting factors are either chosen as $w_2=w_1$ or $w_2=-w_1$. The advantage of such a transform is that, in the encoder, the rotation angle $\alpha$ can be selected in a way that the variance of one of the two transmitted color channels (i.e., $C_1$ or $C_2$) is minimized while the variance of the other color channel is maximized, which eventually has the effect that the coding efficiency is increased. Due to rounding effects, the actually applied transform may slightly deviate from the above formula. The weighting factors $w_1$ and $w_2$ may be chosen in a way that the transform can be calculated using simplified arithmetic operations. As an example, the applied transform may be calculated according to $$Cb' = C_1' + a \cdot C_2',$$

$$Cr' = C_2' - a \cdot C_1'.$$

In this above formula, we chose $w_1=w_2=1/\cos\alpha$ and $\alpha=\tan\alpha$. It should be noted that the above formula represents one specific configuration; other configurations which yield similar simple reconstruction rules are also possible. The multiplications with a (in general) real factor $\alpha$ can be implemented by approximating the real multiplication with an integer multiplication and a bit shift to the right (for example, using formulas similar to $Cb'=C'_1+((\alpha_{int}\cdot C'_2)>>\text{shift})$). At the encoder side, the forward transform that maps the original color channels Cb and Cr to the actually coded components $C_1$ and $C_2$ can be calculated as the inverse of the reconstruction transform (including corresponding approximations). One or more of the multiple supported ICT transforms may correspond to such orthogonal transform with different rotation angles $\alpha$ (and suitably selected weighting factors), or alternatively, different scaling factors $\alpha$.

As mentioned above, the transform-based ICT method can be extended to more than two color components, in which case, N>2 coded color channels are linearly mapped to N reconstructed color components. The applied transform can be specified by multiple rotation angles or, more generally, an N×N transform matrix (with at least nearly orthogonal basis functions). As for the N=2 case, the actually applied transform can be specified by linear combinations using integer operations.

ICT Class 2: Down-Mixing-Based Coding with a Reduction of the Number of Color Channels As mentioned above, the main advantage of the transform-based ICT variant described above is that the variance of one of the resulting components becomes small compared to the variance of the other component (for blocks with a certain amount of correlation). Often, this results in one of the components being quantized to zero (for the entire block). For simplifying implementations, the color transform can be implemented in a way that one of the resulting components ($C_1$ or $C_2$) is forced to be quantized to zero. In this case, both original color channels Cb and Cr are represented by a single transmitted component C. And given the reconstructed version of the color component, denoted by C', the reconstructed color channels Cb' and Cr' can be obtained according to $$\begin{bmatrix} Cb' \\ Cr' \end{bmatrix} = \begin{bmatrix} w \cdot \sin\alpha \\ w \cdot \cos\alpha \end{bmatrix} \cdot C',$$

where $\alpha$ represents a rotation angle and w represents a scaling factor. Similar as above, the actual implementation can be simplified, for example according to $$Cb' = C',\ Cr' = a \cdot C';\ \text{or}$$

$$Cr' = C',\ Cb' = b \cdot C'.$$

One or more of the multiple supported ICT transforms may correspond to such a joint component coding with different rotation angles $\alpha$, or different scaling factors a, b (in combination with a decision which of the color components is set equal to the transmitted component C). At the encoder, the actually coded color component C is obtained by a so-called down-mixing, which can be represented as a linear combination $C=m_1\cdot Cb+m_2\cdot Cr$, where the factors $m_1$ and $m_2$ may, for example, be chosen in a way that the distortion of the reconstructed color components Cb' and Cr' is minimized.

Similar as for the variant 1 above, this second variant can also be generalized to more than two color components. Here, multiple configurations are possible. In a first configuration, the N>2 original color channels are represented by a single joint color channel (M=1 resulting coded components). In another configuration, the N>2 original color channels are represented by M<N (with M>1) resulting channels (for example, M=N−1 channels). For both configurations, the reconstruction of the original color channels can be represented by a matrix (with N rows and M<N columns) with corresponding mixing factors (which may be implemented using integer multiplications and bit shifts).

The more than one supported ICT methods can include zero or more variants of the transform-based method (specified by rotation angles or scaling factor) and zero or more variants of the down-mixing-based method (specified by rotation angles or scaling factors (possibly with an additional flag specifying which color component is set equal to the transmitted component). This includes the case that (a) all ICT methods represent transform-based variants, (b) all ICT methods represent down-mixing-based variants, and (c) the two or ICT methods represent a mixture of transform-based and down-mixing-based variants. At this, it should be pointed out again that the rotation angles or mixing factors are not transmitted on a block basis. Instead, a set of ICT methods is pre-defined and known by both encoder and decoder. At the block basis, only an index identifying one of the more than one ICT methods is signaled (by means of binary flags or non-binary syntax elements). A subset of the pre-defined set of ICT methods may be selected on a sequence, picture, tile, or slice basis, in which case the index coded at a block basis signals the selected method out of the corresponding subset.

According to an embodiment, a block of samples for a color component is transmitted using the concept of transform coding, consisting of or at least comprising a 2d transform mapping the block of samples to a block of transform coefficients, a quantization of the transform coefficients, and an entropy coding of the resulting quantization indexes (also referred to as transform coefficient levels). At the decoder side, the block of samples is reconstructed by first de-quantizing the entropy-decoded transform coefficient levels to obtain reconstructed transform coefficients (the dequantizing typically consists of a multiplication with a quantization step size) and then applying an inverse transform to the transform coefficients to obtain a block of reconstructed samples. Moreover, the block of samples that is transmitted using transform coding often represents a residual signal, which specifies the difference between an original signal and a prediction signal. In this case, the decoded block of an image is obtained by adding the reconstructed block of residual samples to the prediction signal. At the decoder side, the ICT methods can be applied as follows:

- The ICT transform is applied to the reconstructed transform coefficients (after de-quantization); the ICT transform is then followed by the inverse 2d transform for the individual color components and, if applicable, an addition of the prediction signal;
- The ICT transform is applied to the reconstructed residual signals. That means the coded color components are first de-quantized and inverse transformed by a 2d transform. The resulting block/blocks of residual samples are transformed using an ICT transform and the ICT transform may be followed by an addition of the prediction signal.

Note that both of these configurations would yield the same result if both the ICT and the 2*d* transform would not include any rounding. But since in embodiments, all transforms may be specified in integer arithmetic including rounding, the two configurations do then yield different results. It should be noted that it is also possible to apply the ICT transform before de-quantization or after the addition of the prediction signal.

As mentioned above, the actual implementation of the ICT methods may deviate from a unitary transform (due to the introduction of scaling factors that simplify the actual implementation). This fact should be considered by modifying the quantization step size accordingly. That means, in an embodiment of the invention, the selection of a particular ICT method implies a certain modification of the quantization parameter (and, thus, the resulting quantization step size). The modification of the quantization parameter may be realized by a delta quantization parameter, which is added to the standard quantization parameter. The delta quantization parameter may be the same for all ICT methods, or different delta quantization parameters may be used for different ICT methods. The delta quantization parameter used in connection with one or more ICT methods may be hard-coded or it may be signaled as part of the high-level syntax for a slice, picture, tile, or coded video sequence.

3.2. Implicit Signaling of Applied One of at Least Two ICT Methods

As noted in the Section 3.1, the activation of the inventive one of at least two ICT methods is advantageously signaled explicitly, from the encoder to the decoder, using an on/off flag so as to instruct the decoder to apply the inverse ICT (i. e., the transpose of the ICT processing matrix) upon decoding. However, for each picture or block in which ICT coding (i. e., forward ICT) and decoding (i. e., inverse ICT) are active, it is still useful to signal to the decoder which one of the at least two ICT methods is applied to the processed picture or block at hand. Although, intuitively, an explicit signaling of the specific ICT method (using one or more bits or bins per picture resp. block) may be used, an implicit signaling is advantageously employed, as this form of signaling was found to minimize the side-information overhead for the inventive ICT scheme.

There are two advantageous embodiments for implicit signaling of the applied ICT method. Both make use of existing "residual zeroness" indicators in modern codecs like HEVC and VVC [3], specifically, coded block flag (CBF) bitstream elements which are associated with each color component of each transform unit. A CBF value of 0 (false) means that the residual block is not coded (i. e., all residual samples are quantized to zero and, therefore, no quantized residual coefficients need to be transmitted in the bitstream) while a CBF value of 1 (true) implies that at least one residual sample (or transform coefficient) is quantized to a nonzero value for the given block and, thus, a quantized residual of said block is coded in the bitstream.

3.2.1. Implicit Signaling of One Out of Two ICT Methods

For joint ICT coding of two component residual signals, two CBF elements are available for implicit ICT method signaling. When providing two ICT downmix/upmix methods, the advantageous implicit signaling is:

| CBF of First Color Component (e.g. Cb) | CBF of Second Color Component (e.g. Cr) | Implicitly Signaled ICT Method to Apply |
|---|---|---|
| 0 (false) | 0 (false) | none |
| 1 (true) | 0 (false) | method 1 |
| 0 (false) | 1 (true) | method 2 |
| 1 (true) | 1 (true) | none |

3.2.2. Implicit Signaling of One Out of Three ICT Methods

If, as in Subsection 3.2.1, two CBF elements are available for implicit ICT method signaling, but three instead of two ICT downmix/upmix methods are provided for application, the advantageous implicit signaling is:

| CBF of First Color Component (e.g. Cb) | CBF of Second Color Component (e.g. Cr) | Implicitly Signaled ICT Method to Apply |
|---|---|---|
| 0 (false) | 0 (false) | none |
| 1 (true) | 0 (false) | method 1 |
| 0 (false) | 1 (true) | method 2 |
| 1 (true) | 1 (true) | method 3 |

If the CBFs for both color components are zero in a block, no nonzero residual samples are coded in the bitstream for either component, making it superfluous to convey information on the applied ICT method.

3.3. Optional Direct or Indirect Signaling of ICT Decoding Parameters

The previous sections described how the activation of an ICT method in a picture or block is explicitly signaled (using an on/off flag) and how the actual choice of the one of at least two ICT methods is implicitly signaled (by means of existing CBF "residual zeroness" indicators) for the affected color components. The set of possible two or more ICT methods may comprise certain predetermined (fixed) or input dependent (adaptive) parametrizations of size-two discrete cosine transform (DCT) or discrete sine transform (DST) or Walsh-Hadamard transform (WHT) or Karhunen-Loève transform (KLT, also known as principal component analysis, PCA) instances, or Givens rotations or linear predictive coding functions. All these ICT methods result in one or two downmix signals, given two input residual signals, in their forward form and two upmix signals, given one or two (possibly quantized) downmix signals, in their inverse realization.

A set of two or more ICT methods with fixed parametrizations may be characterized by a specific preselection of, e. g., the rotation angles or coefficients of the size-two transforms or linear-predictor functions. This parametrization is known to both the encoder and decoder, so it does not need to be transmitted in the bitstream. In the known technology [2], a fixed "−1" parametrization, yielding the downmix rule "C=(Cb−Cr)/2" and the upmix rule "Cb'=C, Cr'=−C", is employed. In the present approach, where more than one ICT method is available for selection by the encoder, a fixed set of two ICT methods (cf. sec. 3.2.1) may be

| ICT Method | Downmix Rule (Forward Transform) | Upmix Rule (Inverse Transform) |
|---|---|---|
| 1 (primary) | C = (Cb + Cr)/2 | Cb' = C'<br>Cr' = C' |
| 2 (secondary) | C = (Cb − Cr)/2 | Cb' = C'<br>Cr' = −C' |

while a fixed set of three ICT methods (cf. Subsec. 3.2.2), which may be advantageous compared to a set-of-2, may be

| ICT Method | Downmix Rule (Forward Transform) | Upmix Rule (Inverse Transform) |
|---|---|---|
| 1 (primary) | C = (Cb + Cr)/2 | Cb' = C'<br>Cr' = C' |
| 2 (secondary) | C = (Cb − Cr)/2 | Cb' = C'<br>Cr' = −C' |
| 3 (tertiary) | $C_1 = (Cb + Cr)/2$<br>$C_2 = (Cb - Cr)/2$ | $Cb' = C_1' + C_2'$<br>$Cr' = C_1' - C_2'$ |

This fixed set-of-3 ICT design, which is similar to the sum-difference coding technique commonly applied in both perceptual and lossless audio coding [4, 5], provides significant coding gain. However, this fixed approach was found to yield relatively uneven distribution of said coding gain across the two processed component signals. To compensate for this issue, a more general rotation-based approach, realized using a size-two KLT also known as principal component analysis (PCA), may be pursued. In this case, the downmix rule is given by $$C_1 = Cb\cdot\cos\alpha + Cr\cdot\sin\alpha \text{ or } C_1 = Cb\cdot\sin\alpha + Cr\cdot\cos\alpha,$$

$$C_2 = -Cb\cdot\sin\alpha + Cr\cdot\cos\alpha \text{ or } C_2 = Cb\cdot\cos\alpha - Cr\cdot\sin\alpha,$$

which in this case represents a forward KLT across the two components, while the respective upmix rule is $$Cb' = C_1'\cdot\cos\alpha - C_2'\cdot\sin\alpha \text{ or } Cb' = C_1'\cdot\sin\alpha + C_2'\cdot\cos\alpha,$$

$$Cr' = C_1'\cdot\sin\alpha + C_2'\cdot\cos\alpha \text{ or } Cr' = C_1'\cdot\cos\alpha - C_2'\cdot\sin\alpha,$$

accordingly representing an inverse KLT; see also [6]. Note that, for a rotation angle of $\alpha=\pi/4$, the right-hand notation in the above formulas represents an orthogonal version of the third (tertiary) ICT method in the above fixed set of three ICT methods. With the KLT/PCA approach, different values for the rotation angle $-\pi\le\alpha\le\pi$ may be employed to parameterize the individual primary, secondary and, optionally, tertiary ICT method above. Specifically, fixed angles such as $\alpha_1=-\pi/8$, $\alpha_2=\pi/8$ and, possibly, $\alpha_3=-\pi/4$ may be defined for a set of 3 ICT methods, with $\alpha_1$, $\alpha_2$, $\alpha_3$ known to both encoder and decoder. It is worth noting that single-output-component variants for the KLT/PCA downmix rules may be defined, where either $C_1'=0$ or $C_2'=0$ and, accordingly, the upmix rule is simplified to reconstruct the Cb' and Cr' component signals from only the coded $C_1'$ or only the coded $C_2'$ signal (see Sec. 3.1). In this way, a fully flexible and generalized set-of-two-or-more ICT methods is constructed which can contain the above set-of-two and set-of-three fixed ICT parametrizations as subsets. This concludes the fixed-parametrization aspect.

It should be noted that for the area of image and video coding, typically, only the bitstream syntax and the decoding process are specified. In that context, the described downmixing (forward ICT transforms) is to be interpreted as a particular example for obtaining down-mix channels for a specific up-mixing rule. The actual implementation in the encoder may deviate from these examples.

For some coding configurations, it is beneficial to determine the rotation angle α in an input dependent adaptive fashion. In such a scenario, a may be calculated from the two input component signals (here Cb and Cr residuals) as $$\alpha = \frac{1}{2}\cdot\tan^{-1}\left(2\cdot CbCr/\left(Cb^2 - Cr^2\right)\right) \text{ or } \alpha = \frac{1}{2}\cdot\tan^{-1}\left(2\cdot CbCr/\left(Cr^2 - Cb^2\right)\right),$$

depending on the applied notation of the KLT downmix/upmix rule (see previous page). The above way of deriving a is based on a correlation-based (i. e., least-squares) approach. Alternatively, the formulation $$\alpha = \text{sign}(CbCr)\cdot\tan^{-1}\left(sqrt\left(Cr^2\right)/sqrt\left(Cb^2\right)\right) \text{ or}$$

$$\alpha = \text{sign}(CbCr)\cdot\tan^{-1}\left(sqrt\left(Cb^2\right)/sqrt\left(Cr^2\right)\right),$$

again depending on the particular KLT downmix/upmix notation, can be used. This calculation represents an intensity-based principal-angle calculation. Both the correlation-based and intensity-based derivation methods (which yield almost identical results on natural image or video content) utilize the dot-products $$CbCr = \text{sum}_{b\in B}(Cb_b\cdot Cr_b),$$

$$Cb^2 = \text{sum}_{b\in B}(Cb_b\cdot Cb_b),\ Cr^2 = \text{sum}_{b\in B}(Cr_b\cdot Cr_b),$$

where B equals the set of all sample locations belonging to the coding block (or picture) processed. The arc-tangent operation $\tan^{-1}$ is generally implemented using the a tan 2 programming function to obtain a with the correct sign, i. e., in the proper coordinate quadrants. The derived $-\pi\leq\alpha\leq\pi$ can be quantized (i. e., mapped) to one of a predefined number of angles and transmitted, along with the ICT on/off flag(s), to the decoder on a block or picture-level. Specifically, the following transmission options may be used in order to inform the decoder about the particular parametrization to apply during inverse ICT processing:

First option: transmit for each coded block and/or each ICT method used in that coded block the quantized/mapped α for that ICT method, either directly as a quantized angle value or indirectly as an index into a look-up table of predefined angles. If only one ICT method is applied in a block and the quantized/mapped α is transmitted for each block, then only one α is transmitted. If ICT coding is not active in a block, no quantized/mapped α is transmitted for this block for efficiency.

Second option: transmit quantized/mapped α values once per picture or video (set of pictures) for all ICT methods applied, or applicable, in said picture or video. This can be performed at the beginning of the picture or video, e. g. in the picture parameter set or, advantageously, the slice header in HEVC or VVC [3]. If ICT coding is not active in the picture or video and/or no chroma coding is being performed (e. g., luma-only input), no quantized/mapped α values need to be transmitted. Again, each a parameter can be transmitted directly as a quantized angular value or indirectly as an index into a look-up table of predefined angle values.

Both options may be combined, either in parallel or sequentially.

To conclude the discussion of the adaptive-parametrization aspect, we note that it should be obvious to those skilled in the art that slight deviations from the abovementioned parameter transmission options are easily implementable. For example, a picture or block-wise ICT parameter transmission from encoder to decoder may be performed only for selected ICT methods out of the set of two or more ICT methods available for coding, e. g., only for methods 1 and 2 or only for method 3. Moreover, it should be evident that, for a transform size of two (i. e. ICTs across two color components), the KLT is equivalent to a DCT or a WHT when $\alpha=\pi/4$ or $\alpha=-\pi/4$. Finally, other transforms or, generally speaking, downmix/upmix rules than the KLT may be employed as ICT, and these may be subject to other parametrizations than rotation angles (in the most general case, actual upmix weights may be quantized/mapped and transmitted).

3.4. Accelerated Encoder-Side Selection of Applied ICT Method

In modern image and video encoders, one of multiple supported coding mode is typically selected based on Lagrangian bit allocation techniques. That means for each supported mode m (or a subset thereof), the resulting distortion D(m) and the resulting number of bits R(m) are calculated and the mode that minimizes a Lagrange function D(m)+λ R(m), with λ being a fixed Lagrange multiplier, is selected. Since the determination of the distortion and rate terms D(m) and R(m) typically may use a 2d forward transform, a (rather complex) quantization, and a test entropy coding for each of the mode, the encoder complexity increases with the number of supported modes. And thus, the encoder complexity also increases with the number of supported ICT modes on a block basis.

There are, however, possibilities to reduce the encoder complexity for evaluating the ICT methods. In the following, we highlight three examples:

- In the encoder, an optimal rotation angle α could be derived based on the original (residual samples) for the color components of a block (e.g., by one of the methods specified above). And given the derived angle, only the ICT methods that represents a rotation closest to this angle is tested by deriving the actual distortion D(m) and the actual number of bits R(m) that may be used for this method m.
- If only down-mixing methods are supported (i.e., method by which the N color components are represented by M<N transmitted channels), the distortion resulting solely from a down-mixing can be evaluated. And then, only the method m that results in a minimum down-mixing distortion is tested using the Lagrangian approach (i.e., by deriving the actual distortion D(m) and the actual bit rate R(m) associated with method m).
- When coding two mixing channels $C_1$' and $C_2$', with a nonzero CBF that may be used for both of these channels as is the case with method 3 in Sec. 3.2.2, an encoder speed-up is possible by testing, after quantization of a first mixing channel (e. g., $C_1$'), whether the quantized version of said first mixing channel exhibits at least one nonzero quantized coefficient. If it does (i. e., its CBF is nonzero), the second mixing channel (e. g., $C_2$') may be quantized and, then, this two-channel method is tested using the Lagrangian approach. If, however, the quantized version of the first mixing channel exhibits only zero-quantized coefficients (i. e., its CBF is zero), then quantization of the second mixing channel can be skipped and the Lagrangian testing of the two-channel method can be aborted since, for the given quantization parameter(s), the two-channel method cannot be implicitly signaled and is, therefore, forbidden.

3.5. Context Modelling for ICT Flag and Mode

The signalling of the ICT usage may be coupled to the CBF information. No signalling may be used when both CBF flags, i.e., the CBF for each transform block (TB) of each chroma component, are equal to zero. Otherwise, the ICT flag may be transmitted in the bitstream depending on the configuration of the ICT application. A differentiation between inner and outer context modelling is helpful in this context, i.e., the inner context modelling selects a context model within a context model set whereas the outer context modelling selects a context model set. A configuration for the inner context modelling is the evaluation of neighbouring TB, e.g., using the above and left neighbour and check for their ICT flag values. The mapping from the values to the context index within the context model set may be additive (i.e., c_idx=L+B), exclusive disjoint (i.e., c_idx=(L«1)+A), or actively (i.e., c_idx=min(1, L+B)). For the outer context modelling, the CBF condition for the ICT flag may be employed. For example, for a configuration using three transforms distinguished by the combination of the CBF flags, separate context sets are employed for each of the CBF combinations. Alternatively, both the outer and the inner context modelling may take the tree depth and the block size into consideration so that different context models or different context model sets are used for different block sizes.

In an advantageous embodiment of the invention, a single context model is employed for the ICT flag, i.e., the context model set size is equal to one.

In a further advantageous embodiment of the invention, the inner context modelling evaluates the neighbouring transform blocks and derive the context model index. In this case, when using the additive evaluation, the context model set size is equal to three.

In an advantageous embodiment of the invention, the outer context modelling employs different context model sets for each CBF flags combination, resulting in three context model sets when ICT is configurated in a way that each CBF combination results in a different ICT transform.

In a further advantageous embodiment of the invention, the outer context modelling employs a dedicated context model set for the case when both CBF flags are equal to one, while the other cases employs the same context model set.

Description provided herein making reference to features of an encoder does also apply, without any limitation, to a respective decoder that is adapted to receive a signal or bitstream from the encoder, directly, e.g., using a data connection such as a wireless or wired network or indirectly by use of storage media such as portable media or servers. Vice versa, features explained in connection with a decoder may be implemented without any limitation as corresponding features in an encoder according to an embodiment. This includes, amongst other features, that features relating to a decoder that rely in evaluating information directly and unambiguously disclose a respective feature of the encoder for generating and/or transmitting respective information. In particular, encoders may comprise a functionality corresponding to claimed decoders, especially to test and evaluate the selected encoding.

In the following, additional embodiments and aspects of the invention will be described which can be used individually or in combination with any of the features and functionalities and details described herein.

1. Encoder for encoding a plurality of components of an image content region of an image to be encoded, wherein the encoder is configured for:
   obtaining the plurality of components representing the image content region;
   selecting an intercomponent transform from a set of intercomponent transforms;
   encoding the plurality of components using the selected intercomponent transform to obtain encoded components; and
   providing the encoded components.
2. The encoder according to aspect 1, wherein the selected intercomponent transform is implemented so as to combine at least a first component of the plurality of components and a second component of the plurality of components.
3. The encoder according to aspect 1 or 2, wherein the encoder is configured for selecting the intercomponent transform based on a cost function, wherein the encoder is configured for selecting the intercomponent transform as having a minimum encoding cost in terms of a resulting decoding distortion and/or a bit-allocation (number of bits).
4. The encoder of aspect 3, wherein the encoder is configured for applying at least a subset of intercomponent transforms to the components to evaluate the cost function and to restrict the subset of intercomponent transforms to intercomponent transforms of the set of intercomponent transforms that lead to a decoding distortion and/or a number of bits of the components that is with a predetermined tolerance range.
5. The encoder according to one of previous aspects, wherein the plurality of components corresponds to at least one of a color domain and/or a luminance-chrominance domain.
6. The encoder according to one of previous aspects, wherein the encoder is configured for encoding the plurality of components so as to have a smaller number of components when compared to the number of obtained components.
7. The encoder according to one of previous aspects, wherein the encoder is configured for obtaining the encoded components so as to comprise at least one downmix channel, the downmix channel representing a combinatory encoding of a first component of the plurality of components and of a second component of the plurality of components.
8. The encoder according to aspect 7, wherein the downmix channel is a first downmix channel, wherein the encoder is further configured for obtaining the encoded components so as to comprise a second downmix channel and for providing the encoded components based on providing the first downmix channel and the second downmix channel.
9. The encoder according to aspect 7 or 8, wherein the encoder is configured for encoding at least two downmix channels, wherein the encoder is configured for determining, after quantization of a first mixing channel, whether the quantized version of said first mixing channel exhibits at least one nonzero quantized coefficient;
   wherein the encoder is configured for, in a positive case, quantizing the second mixing channel and, then, this to test the implemented two-channel method using a Lagrangian approach; and
   wherein the encoder is configured for, in a negative case, skipping quantization of the second mixing channel and skipping or aborting Lagrangian testing of the two-channel method.

10. The encoder of one of aspects 7 to 9, wherein the set of intercomponent transforms comprises a plurality of intercomponent transforms that implement a downmixing of components, wherein selecting the intercomponent transform comprises evaluating each of the downmixing transforms with regard to a distortion generated in the components; selecting the downmixing transform having a minimum distortion and performing a Lagrangian testing using the downmixing transform having the minimum distortion.

11. The encoder according to one of previous aspects, wherein the encoder is configured for deciding either to use one intercomponent transform of the set of intercomponent transforms or to use none of the set of intercomponent transforms.

12. The encoder according to aspect 11, wherein the encoder is configured for deciding for each image content region either to use one intercomponent transform of the set of intercomponent transforms or to use none of the set of intercomponent transforms.

13. The encoder according to aspect 12, wherein the encoder is configured for determining a cost of a use of each of the set of intercomponent transforms and a cost of using none of the set of intercomponent transforms and for deciding to use none of the set of intercomponent transforms when the cost thereof is lower than of each of the intercomponent transforms.

14. The encoder according to one of previous aspects, wherein the encoder is configured for signaling, to a decoder, at least one of:

the selected intercomponent transform; and a use or nonuse of an intercomponent transform for the image content region.

15. The encoder according to one of previous aspects, wherein a first intercomponent transform of the plurality of intercomponent transforms and a second intercomponent transform of the plurality of intercomponent transforms is based on a same determination rule structure that differs with regard to at least one parameter between the first and second intercomponent transforms, wherein the encoder is configured for providing or signaling the parameter associated with the selected intercomponent transform to a decoder.

16. The encoder of aspect 16, wherein the parameter relates to a quantization step size of the intercomponent transform.

17. The encoder according to one of previous aspects, wherein the encoder is configured for block-based image or video coding.

18. The encoder of one of previous aspects, wherein the image content region is one of a video, a coding tree unit, a coding unit, a transform unit or a block within a video, image, frame, tile or slice.

19. The encoder according to one of previous aspects, wherein the encoder is configured for signaling the selected intercomponent transform corresponding to a level on which the intercomponent transform is applied to the image content region in a provided bitstream.

20. The encoder of aspect 19, wherein the encoder is configured for implicitly signaling the selected intercomponent transform.

21. The encoder of aspect 20, wherein the encoder is configured for transmitting, for each encoded component, zeroness information, preferably a coded block flag (CBF), indicating if a residual of the respective component comprises nonzero values, wherein a combination of zeroness information for the plurality of components indicates the selected intercomponent transform.

22. The encoder of aspect 20 or 21, wherein the plurality of intercomponent transforms comprises exactly two intercomponent transforms, wherein the encoder is configured for implicitly signaling the selected intercomponent transform (ICT) by use of a first CBF associated with a first component and by use of a second CBF associated with a second component based on the rule

| CBF of First Component | CBF of Second Component | Implicitly Signaled ICT Method to Apply |
|---|---|---|
| 0 (false) | 0 (false) | none |
| 1 (true) | 0 (false) | method 1 |
| 0 (false) | 1 (true) | method 2 |
| 1 (true) | 1 (true) | none |

23. The encoder of aspect 20 or 21, wherein the plurality of intercomponent transforms comprises exactly three intercomponent transforms, wherein the encoder is configured for implicitly signaling the selected intercomponent transform (ICT) by use of a first CBF associated with a first component and by use of a second CBF associated with a second component based on the rule

| CBF of First Component | CBF of Second Component | Implicitly Signaled ICT Method to Apply |
|---|---|---|
| 0 (false) | 0 (false) | none |
| 1 (true) | 0 (false) | method 1 |
| 0 (false) | 1 (true) | method 2 |
| 1 (true) | 1 (true) | method 3 |

24. The encoder according to one of previous aspects, wherein the encoder is configured for signaling a use of one of the set of intercomponent transforms, preferably by use of a binary flag, and for further signaling the selected intercomponent transform.

25. The encoder according to aspect 24, wherein the encoder is configured for signaling the selected intercomponent transform by providing an information indicating at least one parameter related to the selected intercomponent transform; wherein the at least one parameter is a quantized or unquantized value.

26. The encoder according to aspect 24 or 25, wherein the encoder is configured for signaling the use of the intercomponent transform commonly for a plurality of image content regions.

27. The encoder according to one of previous aspects, wherein the first component and/or the second component is a color component; or wherein one of the first and second component is a color component and the other is a non-color component.

28. The encoder of one of previous aspects, wherein the set of intercomponent transforms comprises at least one transform implementing a transform-based coding.

29. The encoder according to aspect 28, wherein at least a first and a second intercomponent transform of the set of intercomponent transforms are based on a transform-based coding, being based on the determination rule:

$$C_1 = C_{E1} \cdot \cos\alpha + C_{E2} \cdot \sin\alpha; \text{ and } C_2 = -C_{E1} \cdot \sin\alpha + C_{E2} \cdot \cos\alpha; \text{ or}$$
$$C_1 = C_{E1} \cdot \sin\alpha + C_{E2} \cdot \cos\alpha; \text{ and } C_2 = C_{E1} \cdot \cos\alpha - C_{E2} \cdot \sin\alpha$$

wherein $C_{E1}$ and $C_{E2}$ are the first and second components, $C_1$ and $C_2$ are the results of the first and second intercomponent transforms, and a denotes a rotation angle applied for the intercomponent transform;

wherein the first and the second intercomponent transform differ with respect to each other in view of the rotation angle $\alpha$.

30. The encoder according to aspect 29, wherein the set of intercomponent transforms comprises at least a third intercomponent transform being based on the same determination rule and varying with regard to the rotation angle.

31. The encoder according to aspect 29 or 30, wherein values of the rotation angle being selectable are predefined and implemented so as to be provided for orthogonal intercomponent transforms.

32. The encoder according to aspect 29 or 30, wherein the encoder is configured for selecting the intercomponent transform by determining the rotation angle to be applied based on at least a first and a second component, preferably using a correlation-based or an intensity-based approach.

33. The encoder according to aspect 32, wherein the encoder is configured for determining the rotation angle based on a correlation-based approach based on the determination rule $$\alpha = \frac{1}{2} \cdot \tan^{-1}\left(2 \cdot C_{E1}C_{E2} / \left(C_{E1}^2 - C_{E2}^2\right)\right); \text{ or}$$
$$\alpha = \frac{1}{2} \cdot \tan^{-1}\left(2 \cdot C_{E1}C_{E2} / \left(C_{E2}^2 - C_{E1}^2\right)\right),$$

wherein where $C_{E1}C_{E2}$, $C_{E1}^2$ and $C_{E2}^2$ are respective entries of a correlation matrix between the first and second components.

34. The encoder according to aspect 37, wherein the encoder is configured for determining the rotation angle based on an intensity-based approach based on the determination rule $$\alpha = \text{sign}(C_{E1}C_{E2}) \cdot \tan^{-1}\left(sqrt\left(C_{E2}^2\right) / sqrt\left(C_{E1}^2\right)\right); \text{ or}$$
$$\alpha = \text{sign}(C_{E1}C_{E2}) \cdot \tan^{-1}\left(sqrt\left(C_{E1}^2\right) / sqrt\left(C_{E2}^2\right)\right),$$

where $C_{E1}C_{E2}$, $C_{E1}^2$ and $C_{E2}^2$ are respective entries of a correlation matrix between the first and second components.

35. The encoder according to one of aspects 31 to 34, wherein the encoder is configured for determining the rotation value a and for using the determined rotation value for a first intercomponent transform, and for inverting a sign of the rotation value to obtain an inverted rotation angle and for using the inverted rotation angle for a second intercomponent transform; or rounding up the determined rotation angle to obtain an uprounded rotation angle and using the uprounded rotation angle for a first intercomponent transform; and for rounding down the determined rotation angle to obtain a downrounded rotation angle and using the downrounded rotation angle for a second intercomponent transform.

36. The encoder of one of aspects 29 to 35, wherein the encoder is configured for signaling the rotation angle or an information indicating the rotation angle or indicating a quantized version thereof, wherein the signaling is valid for at least one image content region.

37. The encoder according to aspect 36, wherein the signaling is valid for at least two image content regions.

38. The encoder of one of previous aspects, wherein the set of intercomponent transforms comprises at least one transform implementing a down-mixing-based coding with a reduction of the number of components.

39. The encoder of aspect 38, wherein a first intercomponent transform and a second intercomponent transform are based on the determination rules:

| ICT Method | Downmix Rule (Forward Transform) | Upmix Rule (Inverse Transform) |
|---|---|---|
| 1 (primary) | $C = (C_{E1} + C_{E2})/2$ | $C'_{D1} = C'$ |
| | | $C'_{D2} = C'$ |
| 2 (secondary) | $C = (C_{E1} - C_{E2})/2$ | $C'_{D1} = C'$ |
| | | $C'_{D2} = -C'$ |

wherein $C_{E1}$ and $C_{E2}$ are the first and second components, C is the result of the intercomponent transform, C' is the decoded result of the intercomponent result at the decoder and $C_{D1}'$ and $C_{D2}'$ are the decoded first and second components.

40. The encoder of aspect 38, wherein a first intercomponent transform, a second intercomponent transform and a third intercomponent transform are based on the determination rules:

| ICT Method | Downmix Rule (Forward Transform) | Upmix Rule (Inverse Transform) |
|---|---|---|
| 1 (primary) | $C = (C_{E1} + C_{E2})/2$ | $C'_{D1} = C'$ |
| | | $C'_{D2} = C'$ |
| 2 (secondary) | $C = (C_{E1} - C_{E2})/2$ | $C'_{D1} = C'$ |
| | | $C'_{D2} = C'$ |
| 3 (tertiary) | $C_1 = (C_{E1} + C_{E2})/2$ | $C'_{D1} = C'_1 + C'_2$ |
| | $C_2 = (C_{E1} - C_{E2})/2$ | $C'_{D2} = C'_1 - C'_2$ |

wherein $C_{E1}$ and $C_{E2}$ are the first and second components, C, $C_1$ and $C_2$ are results of the intercomponent transform, C', $C_1'$ and $C_2'$ are decoded results of the intercomponent transform at the decoder and $C_{D1}'$ and $C_{D2}'$ are the decoded first and second components.

41. The encoder according to one of previous aspects, wherein a first component $C_{E1}$ of the plurality of components is a Cb component of a YCbCr scheme; wherein a second component $C_{E2}$ of the plurality of components is a Cr component of the YCbCr scheme.

42. The encoder of one of previous aspects, wherein the set of intercomponent transforms comprises at least one transform implementing a transform-based coding; and comprises at least one transform implementing a downmixing-based coding with a reduction of the number of components.

43. The encoder of one of previous aspects, wherein the set of intercomponent transforms comprises at least one of a discrete cosine transform, a discrete sine transform, a Walsh-Hadamard transform, and a Karhunen-Loève transform/principal component analysis.

44. The encoder of one of previous aspects, wherein the set of intercomponent transforms comprises at least one transform that is adapted so as to combine the first component and the second component to a common component such that the first component and the second component are represented by the common component, wherein the encoder is configured for providing the common component.

45. The encoder of one of previous aspects, wherein the encoder is configured for signaling on a basis of the image content region, an index identifying the selected intercomponent transform.

46. The encoder of one of previous aspects, wherein the encoder is configured for applying the selected intercomponent transform to the plurality of components so as to obtain a residual signal and to provide the residual signal as the encoded components.

47. The encoder of one of previous aspects, wherein the encoder is configured for encoding the plurality of components prior to adding a prediction signal or before a de-quantization of image content.

48. Decoder configured for decoding encoded components of an image content region of a received image, wherein the decoder is configured for:

obtaining the encoded components;

selecting an inverse intercomponent transform from a set of inverse intercomponent transforms; and decoding a plurality of components representing the image content region using the selected inverse intercomponent transform.

49. The decoder according to aspect 48, wherein the decoder is configured for decoding a first component and a second component of the plurality of components by upmixing at least one decoded downmix channel related to the received image content region, the decoded downmix channel representing a combinatory encoding of the first component and of the second component of the plurality of components.

50. The decoder of aspect 49, wherein the decoder is configured for decoding the first component and the second component based on the determination rule $$Cb' = aC'; Cr' = bC'$$

wherein Cb' is the decoded first component, Cr' is the decoded second component, a and b represent mixing factors and C' is the decoded downmix channel.

51. The decoder according to aspect 50, wherein either the mixing factor a or the mixing factor b is equal to 1.

52. The decoder of one of previous aspects, wherein at least a first inverse intercomponent transform of the set of inverse intercomponent transforms is based on the determination rule:

$$\begin{bmatrix} C'_{D1} \\ C'_{D2} \end{bmatrix} = \begin{bmatrix} \cos\alpha & \sin\alpha \\ -\sin\alpha & \cos\alpha \end{bmatrix} \cdot \begin{bmatrix} w_1 & 0 \\ 0 & w_2 \end{bmatrix} \cdot \begin{bmatrix} C'_{E1} \\ C'_{E2} \end{bmatrix},$$

wherein the determination rule represents two inverse intercomponent transforms;

wherein α represents a rotation angle in the signal space and $w_1$ and $w_2$ represent non-zero weighting factors, $C'_{E1}$ and $C,_{E2}$ represent reconstructed versions of the encoded components; and $C_{D1}'$ and $C_{D2}'$ represent the components derived using a transform with orthogonal basis functions at a decoder.

53. The decoder according to aspect 52, wherein the decoder is configured for implementing $w_2=w_1$ or $w_2=-w_1$.

54. The decoder of aspect 52 or 53, wherein at least a first intercomponent transform of the set of intercomponent transforms is based on the determination rules:

$$C'_{D1} = C'_{E1} + \alpha \cdot C'_{E2}; \text{ and}$$

$$C'_{D2} = C'_{E2} - a \cdot C'_{E1}.$$

wherein $w_1=w_2=1/\cos\alpha$ and a represents a parameter that corresponds to α=tan α.

55. The decoder of one of aspects 52 to 54, wherein the decoder is configured for selecting the rotation angle so as to obtain essentially orthogonal intercomponent transforms.

56. The decoder according to one of aspects 49 to 55, wherein the decoded downmix channel is a first downmix channel, wherein the decoder is configured for obtaining a second decoded downmix channel related to the same received image content region, wherein the decoder is configured for obtaining at least a third component based on decoding the second downmix channel.

57. The decoder according to aspect 56, wherein the decoder is configured for decoding the first downmix channel using a first inverse intercomponent transform from the plurality of inverse intercomponent transforms; and for decoding the second downmix channel using a second inverse intercomponent transform from the plurality of inverse intercomponent transforms; wherein the decoder is configured for selecting the first and the second inverse intercomponent transform so as to be essentially orthogonal with respect to each other.

58. The decoder according to one of aspects 48 to 57, wherein the decoder is configured for receiving information indicating an inverse intercomponent transform from the set of inverse intercomponent transforms and to select the inverse intercomponent transform in accordance with the information.

59. The decoder of aspect 58, wherein the decoder is configured for receiving, for each encoded component, zeroness information, preferably a coded block flag (CBF), indicating if a residual of the respective component comprises nonzero values, wherein a combination of zeroness information for the plurality of components indicates the selected intercomponent transform.

60. The decoder of aspect 58 or 59, wherein the plurality of inverse intercomponent transforms comprises exactly two inverse intercomponent transforms, wherein the decoder is configured for decoding an implicitly signaled intercomponent transform (ICT) selected by an encoder by use of a first CBF associated with a first component and by use of a second CBF associated with a second component based on the rule

| CBF of First Component | CBF of Second Component | Implicitly Signaled ICT Method to Apply |
|---|---|---|
| 0 (false) | 0 (false) | none |
| 1 (true) | 0 (false) | method 1 |
| 0 (false) | 1 (true) | method 2 |
| 1 (true) | 1 (true) | none |

61. The decoder of aspect 58 or 59, wherein the plurality of inverse intercomponent transforms comprises exactly three inverse intercomponent transforms, wherein the decoder is configured for decoding an implicitly signaled intercomponent transform (ICT) selected by an encoder by use of a first CBF associated with a first component and by use of a second CBF associated with a second component based on the rule

| CBF of First Component | CBF of Second Component | Implicitly Signaled ICT Method to Apply |
|---|---|---|
| 0 (false) | 0 (false) | none |
| 1 (true) | 0 (false) | method 1 |
| 0 (false) | 1 (true) | method 2 |
| 1 (true) | 1 (true) | method 3 |

62. The decoder according to one of aspects 48 to 62, wherein the decoder is configured for obtaining from a received bitstream comprising the encoded components as a decoded common component representing a first component and a second component; and for selecting an inverse intercomponent transform that leads the decoder to determine the first component and the second component based on the determination rule:

$$\begin{bmatrix} C'_{D1} \\ C'_{D2} \end{bmatrix} = \begin{bmatrix} w \cdot \sin\alpha \\ w \cdot \cos\alpha \end{bmatrix} \cdot C' \text{ or } \begin{bmatrix} C'_{D1} \\ C'_{D2} \end{bmatrix} = \begin{bmatrix} w \cdot \cos\alpha \\ w \cdot \sin\alpha \end{bmatrix} \cdot C',$$

wherein $\alpha$ represents a rotation angle, w represents a scaling factor, $C_{D1}'$ and $C_{D2}'$ represent the decoded first and second component and C' represents the decoded common component.

63. The decoder according to aspect 62, wherein the decoder is configured for selecting the inverse intercomponent transform so as to determine the first component and the second component based on the determination rule:

$$C'_{D1} = C',\ C'_{D2} = a \cdot C'$$

or based on the determination rule $$C'_{D2} = C',\ C'_{D1} = b \cdot C'$$

wherein a and b represent scaling factors.

64. The decoder of one of aspects 48 to 63, wherein the decoder is configured for receiving the encoded components as a residual signal; wherein decoding the selected inverse intercomponent transform comprises adding a reconstructed image content to the encoded components.

65. The decoder of one of aspects 48 to 64, wherein at least a first and a second inverse intercomponent transform of the set of inverse intercomponent transforms are based on a transform-based coding, being based on the determination rule:

$$C'_{D1} = C'_1 \cdot \cos\alpha - C'_2 \cdot \sin\alpha; \text{ and } C'_{D2} = C'_1 \cdot \sin\alpha + C'_2 \cdot \cos\alpha; \text{ or}$$

$$C'_{D1} = C'_1 \cdot \sin\alpha + C'_2 \cdot \cos\alpha; \text{ and } C'_{D2} = C'_1 \cdot \cos\alpha - C'_2 \cdot \sin\alpha$$

wherein $C_{D1}$ and $C_{D2}$ are the received first and second components, $C_1'$ and $C_2'$ are the results of the first and second inverse intercomponent transforms, and a denotes a rotation angle applied for the intercomponent transform;

wherein the first and the second inverse intercomponent transform differ with respect to each other in view of the rotation angle $\alpha$.

66. The decoder according to one of aspects 48 to 65, wherein the decoder is configured for decoding the image content region using a context model of a context model set, wherein the context model employs previously decoded image content regions of an image; wherein the context model set is associated with an intercomponent transform flag indicating that an intercomponent transform is used.

67. The decoder according to aspect 66, wherein the decoder is configured for selecting the context model from at least a first and a second context model; or for selecting between a use and a nonuse of the context model.

68. The decoder according to aspect 67, wherein the decoder is configured for selecting the context model from a set of context models that comprises at least one context model.

69. The decoder according to aspect 67 or 68, wherein the context model set comprises a number of exactly three context models, wherein the decoder is configured for evaluating neighboring image content regions of the image content region and for selecting the context model for the current image content region based on the evaluation.

70. The decoder according to aspect 69, wherein the decoder is configured for evaluating neighboring image content regions of the image content region based on an context index within the context model set that is additive (i.e., c_idx=L+A), exclusive disjoint (i.e., c_idx=(L«1)+A), or actively (i.e., c_idx=min(1, L+A)); wherein the indec c_idx indicates the context model that is selected and L and A denote neighboring image content regions, e.g. a left and an above neighbor.

71. The decoder according to one of aspects 66 to 70, wherein the decoder is configured for selecting one context model set from at exactly three context model sets and for selecting the context model from the at least one context model contained in the selected context model set.

72. The decoder according to one of aspects 66 to 71, wherein, for selecting the context model, the decoder is configured for employing a coded block information (coded block flag condition) for an intercomponent transform flag indicating the intercomponent transform used.

73. The decoder according to aspect 72, wherein the coded block information comprises a first coded block flag and a second coded block flag for at least a first and a second component, wherein the decoder is configured for associating different context model sets with different combinations of the first and second coded block flags.

74. The decoder according to aspect 73, wherein the context model set comprises exactly one context model being related to the inter component transform flag.

75. The decoder according to one of aspects 66 to 74, wherein the decoder is configured for receiving for each encoded component, zeroness probability information, indicating a probability preferably a coded block flag (CBF), indicating if a residual of the respective component comprises nonzero values, and for selecting a first context model set comprising at least one context model responsive to exactly one zeroness information indicating a non-zero residual, and for selecting a different second context model set comprising at least one context model responsive to at least a first and a second zeroness information indicating a respective non-zero residual.

76. Method for encoding a plurality of components of an image content region of an image to be encoded, wherein the method comprises:
obtaining the plurality of components representing the image content region;
selecting an intercomponent transform from a set of intercomponent transforms;
encoding the plurality of components using the selected intercomponent transform to obtain encoded components; and
provide the encoded components.

77. Method for decoding encoded components of an image content region of a received image, wherein the method comprising:
obtaining the encoded components;
selecting an inverse intercomponent transform from a set of inverse intercomponent transforms; and
decoding a plurality of components representing the image content region using the selected inverse intercomponent transform.

78. A computer readable digital storage medium having stored thereon a computer program having a program code for performing, when running on a computer, a method according to aspect 76 or 77.

79. A data stream obtained by a method according to aspect 76 or 77.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded image or video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] K. Zhang, J. Chen, L. Zhang, M. Karczewicz, "Enhanced cross-component linear model intra prediction," JVET-D0110, 2016, http://phenix.it-sudparis.eu/jvet/doc_end_user/current_document.php?id=2806

[2] J. Lainema, "CE7-rel.: Joint coding of chrominance residuals," JVET-M0305, Marrakech, January 2019. http://phenix.it-sudparis.eu/jvet/doc_end_user/current_document.php?id=5112

[3] B. Bross, J. Chen, S. Liu, "Versatile Video Coding (Draft 4)," v. 4, JVET-M1001, Marrakech, February 2019. http://phenix.it-sudparis.eu/jvet/doc_end_user/current_document.php?d=5755

[4] J. D. Johnston, "Perceptual Transform Coding of Wideband Stereo Signals," in Proc. *IEEE Int. Conf. Acoust. Speech Sig. Process*. (*ICASSP*), Glasgow, vol. 3, pp. 1993-1996, May 1989.

[5] J. D. Johnston and A. J. S. Ferreira, "Sum-Difference Stereo Transform Coding," in *Proc. IEEE Int. Conf. Acoust. Speech Sig. Process*. (*ICASSP*), San Francisco, vol. 2, pp. 569-572, March 1992.

[6] R. G. van der Waal and R. N. J. Veldhuis, "Subband Coding of Stereophonic Digital Audio Signals," in *Proc. IEEE Int. Conf. Acoust. Speech Sig. Process*. (*ICASSP*), Toronto, pp. 3601-3604, April 1991. https://www.computer.org/csdl/proceedings/icassp/1991/0003/00/00151053.pdf

The invention claimed is:

1. A block based video encoder comprising at least one processor for jointly coding residual samples of a first chroma block, Cb, and a second chroma block, Cr, the first and second chroma blocks being different color components of a corresponding picture block, the at least one processor configured to:

select a pair of coefficients (a, b) from a plurality of pairs of coefficients;

determine a jointly coded block, C, from the first chroma block and the second chroma block, wherein a reconstructed jointly coded block, C', is obtained from an encoded jointly coded block, and a reconstructed first chroma block, Cb', and a reconstructed second chroma block, Cr' are determined according to $$Cb' = aC' \text{ and } Cr' = bC';$$

encode the jointly coded block; and signal to a decoder the selected pair of coefficients (a, b) from the plurality of pairs of coefficients using a coded block flag (CBF) of the reconstructed first chroma block, which if set indicates that at least one residual sample of the reconstructed first chroma block is nonzero, and a CBF of the reconstructed second chroma block, which if set indicates that at least one residual sample of the reconstructed second chroma block is nonzero.

2. The block based video encoder of claim 1, wherein the at least one processor is configured to encode the jointly coded block by:

transforming the jointly coded block with a 2d transform mapping to a block of transform coefficients, quantizing the block of transform coefficients, and entropy coding the quantized block.

3. The block based video encoder of claim 1, wherein the at least one processor is configured to select the pair of coefficients (a,b) by minimizing a rate-distortion cost function with respect to the plurality of pairs of coefficients.

4. The block based video encoder of claim 3, wherein the coded block flag of the reconstructed first chroma block and the coded block flag of the reconstructed second chroma block are existing bitstream elements used also when the first and second chroma blocks are not jointly coded.

5. The block based video encoder of claim 1, wherein the at least one processor is configured to determine whether to jointly code the first chroma block and the second chroma block or to separately code the first chroma block and the second chroma block.

6. The block based video encoder of claim 5, wherein the at least one processor is configured to determine whether to jointly code or to separately code by evaluating a rate-distortion cost function.

7. The block based video encoder of claim 5, wherein the at least one processor is configured to signal to a decoder a binary flag indicating whether the first chroma block and the second chroma block are jointly coded.

8. The block based video encoder of claim 1, wherein the plurality of pairs of coefficients comprises three pairs of coefficients (a1,b1), (a2,b2), and (a3,b3), and wherein the block based video encoder is configured to signal the selected pair of coefficients by use of the coded block flag (CBF) associated with the reconstructed first chroma block and by use of the CBF associated with the reconstructed second chroma block based on a rule according to

| CBF of the reconstructed first chroma block | CBF of the reconstructed second chroma block | Implicitly Signaled coefficients to apply at the decoder |
|---|---|---|
| 1 | 0 | $(a_1, b_1)$ |
| 0 | 1 | $(a_2, b_2)$ |
| 1 | 1 | $(a_3, b_3)$. |

9. A block based video decoder comprising at least one processor configured for decoding jointly coded residual samples of a first chroma block and a second chroma block from a bitstream, the first and second chroma blocks being different chroma color components of a corresponding picture block, for the at least one processor configured to:

decode, from the bitstream, a binary flag which indicates that the first chroma block and the second chroma block are jointly coded;

determine a reconstructed jointly coded block, C', from the bitstream;

decode, from the bitstream, a coded block flag (CBF) of a reconstructed first chroma block, Cb', which if set indicates that at least one residual sample of the reconstructed first chroma block is nonzero, and a CBF of a reconstructed second chroma block, Cr', which if set indicates that at least one residual sample of the reconstructed second chroma block is nonzero;

determine a pair of coefficients (a, b) of a plurality of pairs of coefficients based on the CBF of the reconstructed first chroma block and the CBF of the reconstructed second chroma block; and determine the reconstructed first chroma block, Cb', and the reconstructed second chroma block, Cr', according to $$Cb' = aC' \text{ and } Cr' = bC'.$$

10. The block based video decoder of claim 9, wherein the coded block flag of the reconstructed first chroma block and the coded block flag of the reconstructed second chroma block are existing bitstream elements used also when the first and second chroma blocks are not jointly coded.

11. The block based video decoder of claim 9, wherein either a or b is equal to 1.

12. The block based video decoder of claim 9, wherein the plurality of pairs of coefficients comprises three pairs of coefficients (a1,b1), (a2,b2), and (a3,b3), and wherein the block based video decoder is configured to determine the pair of coefficients by use of the CBF associated with the reconstructed first chroma block and by use of the CBF associated with the reconstructed second chroma block based on a rule according to:

| CBF of the reconstructed first chroma block | CBF of the reconstructed second chroma block | Implicitly Signaled coefficients to apply at the decoder |
|---|---|---|
| 1 | 0 | $(a_1, b_1)$ |
| 0 | 1 | $(a_2, b_2)$ |
| 1 | 1 | $(a_3, b_3)$. |

13. The block based video decoder of claim 9, wherein the at least one processor is configured to decode the binary flag by using a context model selected based on the CBF of the reconstructed first chroma block and the CBF of the reconstructed second chroma block.

14. A method of block based video decoding for decoding jointly coded residual samples of a first chroma block and a second chroma block from a bitsream, the first and second chroma blocks being different color components of a corresponding picture block, the method comprising:

decoding, from the bitstream, a binary flag which indicates that the first chroma block and the second chroma block are jointly coded;

determining a reconstructed jointly coded block, C', from the bitstream;

decoding, from the bitstream, a coded block flag (CBF) of a reconstructed first chroma block, Cb', which if set indicates that at least one residual sample of the reconstructed first chroma block is nonzero, and a CBF of a reconstructed second chroma block, Cr', which if set indicates that at least one residual sample of the reconstructed second chroma block is nonzero;

determining a pair of coefficients (a, b) of a plurality of pairs of coefficients based on the CBF of the reconstructed first chroma block and the CBF of the reconstructed second chroma block; and determining a reconstructed first chroma block, Ch', and a reconstructed second chroma block, Cr', according to Cb'=a C' and Cr'=b C'.

* * * * *